G. GEIGER.

Graining-Machines.

No. 133,311.  Patented Nov. 26, 1872.

WITNESSES.  INVENTOR.

UNITED STATES PATENT OFFICE.

GOTTLIEB GEIGER, OF CLEVELAND, OHIO.

IMPROVEMENT IN GRAINING-MACHINES.

Specification forming part of Letters Patent No. 133,311, dated November 26, 1872.

*To all whom it may concern:*

Be it known that I, GOTTLIEB GEIGER, of Cleveland, in the county of Cuyahoga and State of Ohio, have invented an Improved Graining-Machine, of which the following is a specification:

This invention consists of an endless flexible belt, having carved on its surface an imitation of oak or black-walnut grain, arranged on rollers set in an adjustable frame, which is used by placing one end of the belt against the surface to be impressed, and by wheeling the machine over said surface the belt will be revolved and make its impression.

The following description sets forth its construction and operation.

Figure 1:
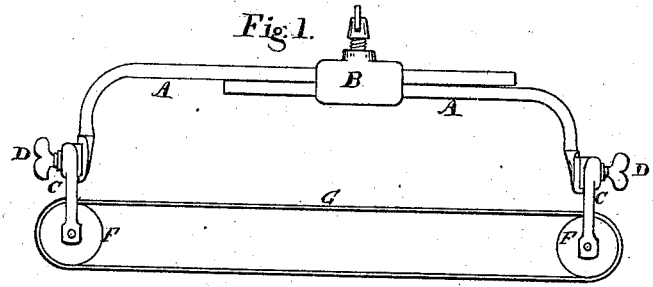
Figure 2:
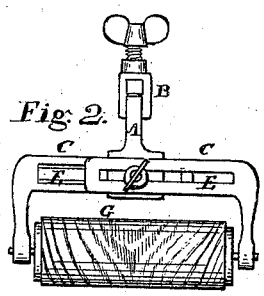
Figure 3:
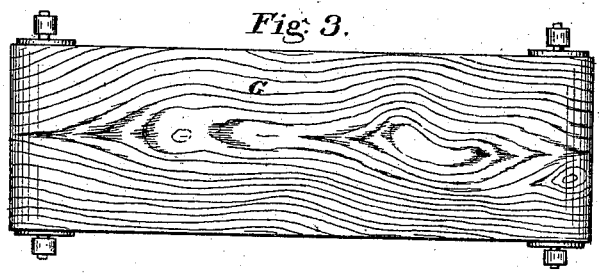

In the drawing, Figure 1 is a side view; Fig. 2 is an end view; and Fig. 3 is a bottom view, or a view of the graining-surface of the belt.

A are bars of a frame placed in a sliding sleeve, B, having a thumb-screw for securing them at any desirable point, whereby the tension of the belt may be regulated. C C are cross-pieces attached to the downward-projecting ends of the bars A by thumb-screws D D. The cross-pieces C C are in two parts, having slots E E in them, through which the thumb-screws pass, the slots E E enabling them to be adjusted. The cross-pieces C C have downward-projecting arms, in the ends of which are placed the journals of rollers F F. Placed on the rollers F F is an endless belt, of thick leather or other suitable flexible material, G, on the outer surface of which is carved or impressed a pattern of wood-graining, as seen in Fig. 3.

To use this machine, the operator, after having painted over the surface to receive impression, takes the machine in hand by the bars A, and, placing the belt at one end against the said painted surface, by pushing, the machine is propelled along over said surface; the belt, revolving, leaves its impression in the fresh paint.

In this manner quite a variety of impressions may be made with one belt, as the belt may be so placed as to commence the impression at different points on its surface. The frame being made adjustable enables it to be adapted to several widths of belts, so that the machine can be accommodated to work in a variety of places, as panels, moldings, and plain surfaces.

I claim—

The frame, consisting of the bars A A, sleeve B, slotted cross-pieces C C, thumb-screws D D, rollers F F, and endless impression-belt G, all constructed, combined, and arranged as shown and described, and for the purpose set forth.

GOTTLIEB GEIGER.

Witnesses:
    W. S. KENNIST,
    GEO. MENGER.